May 10, 1949.   G. T. WARREN ET AL   2,470,076
CLARIFICATION OF SUGAR CANE JUICE
Filed Sept. 30, 1947   4 Sheets-Sheet 1
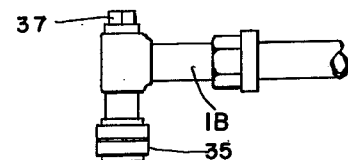
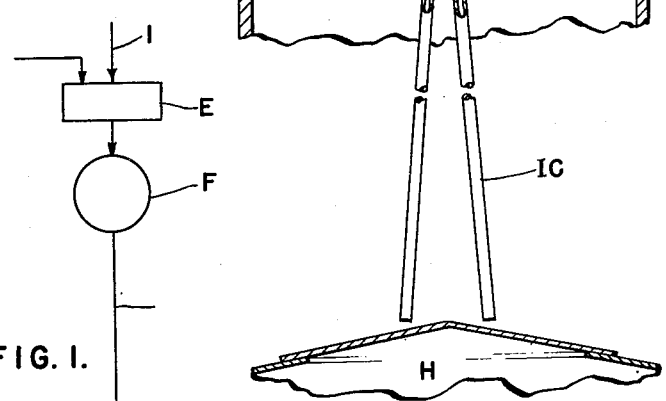
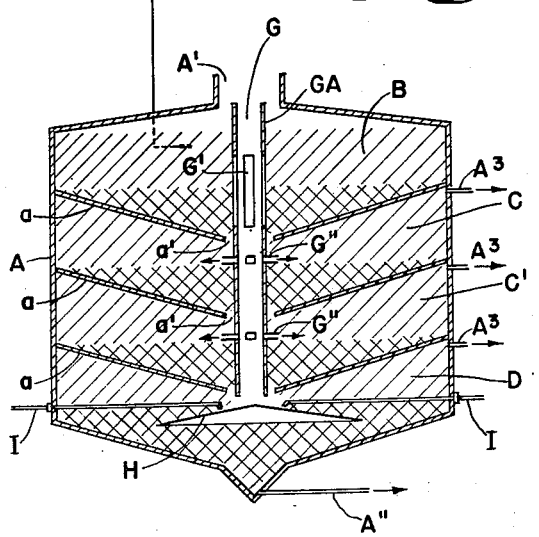
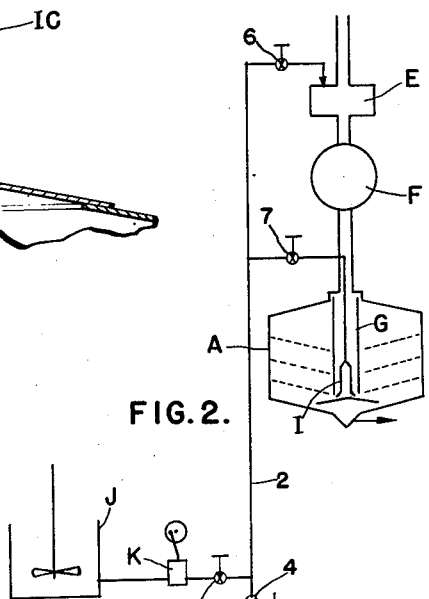
INVENTORS:
GEORGE T. WARREN &
REGINALD A. JORDAN,
BY
Austin Middleton
ATTORNEY INVENTORS:
GEORGE T. WARREN &
REGINALD A. JORDAN,
BY
Arthur Middleton
ATTORNEY May 10, 1949. G. T. WARREN ET AL 2,470,076
CLARIFICATION OF SUGAR CANE JUICE
Filed Sept. 30, 1947 4 Sheets-Sheet 3

INVENTORS:
GEORGE T. WARREN &
REGINALD A. JORDAN,
BY
ATTORNEY

May 10, 1949.  G. T. WARREN ET AL  2,470,076
CLARIFICATION OF SUGAR CANE JUICE
Filed Sept. 30, 1947  4 Sheets-Sheet 4

INVENTORS:
GEORGE T. WARREN &
REGINALD A. JORDAN,
BY
ATTORNEY

Patented May 10, 1949

2,470,076

UNITED STATES PATENT OFFICE 2,470,076

CLARIFICATION OF SUGAR CANE JUICE

George Thomas Warren and Reginald Albert Jordan, Gunthorpes, Antigua, British West Indies, assignors to The Dorr Company, New York, N. Y., a corporation of Delaware Application September 30, 1947, Serial No. 776,982

13 Claims. (Cl. 127—57)

This invention relates to the clarification of sugar cane juice, and particularly to the treatment of the sediment or mud containing the solids settling out of the juice being clarified by a sedimentation and decantation process. The general object of the invention is to provide an improved method of, and apparatus for so clarifying sugar cane juice by sedimentation and decantation, as to obtain a thicker, denser and more readily filterable mud than has been obtained heretofore, while at the same time obtaining a highly efficient yield of clarified juice.

The clarification of sugar cane juice is made necessary by the fact that such juice, as it leaves the mill, ordinarily consists of a turbid solution of cane sugar, reducing sugars, bodies of unknown constitution knows as "gums," salts of both organic and inorganic acids, mainly potash salts, coloring matters, albuminoids, matter in a colloid condition, suspended particles of fibre and dirt, and a variety of other bodies. It has long been generally recognized that effective clarification of cane sugar juice is essential to the efficient production of good sugar from such juice.

In modern practice, after being heated and limed, sugar cane juice is usually clarified in a continuous multitray clarifier comprising a tank divided into superposed clarifying compartments into each of which some of the hot limed juice is passed for clarification therein. In each clarifying compartment solids settle out of the juice, and the supernatant clear juice above the mud is withdrawn from the upper portion of each clarifying compartment. The lowermost clarifying compartment is commonly referred to as a thickening chamber because all of the solids settling out of the juice in the different clarifying chambers is subjected to agitation in the lowermost compartment, to liberate juice entrained or trapped in the collected solids, and work the latter into a relatively thick mud. Solids originally settling on the trays forming the bottom walls of the clarifying compartments above the thickening compartment, are swept or worked off of those trays and move down into the lowermost, or thickening, compartment. In some cases, the uppermost compartment in the tank is used as a feed and conditioning chamber in which juice fed into the clarifier is subject to gentle agitation and given time and opportunity to flocculate before it is passed into the subjacent clarifying compartments.

The clarification of cane sugar juice by sedimentation and decantation, are steps in a defecation process which also includes the action of heat and lime on the juice expressed from the sugar cane. Customarily, the juice entering the multitray clarifier has had enough lime added to it and been so heated that it enters the clarifier with a pH of 7 to 8, or thereabouts, and with a temperature of about 212°–214° F. The clarified juice withdrawn from the clarifying compartments has a temperature but little below the entering juice temperature and has about the same pH as the entering juice. The thickened mud withdrawn from the thickening chamber of the multitray clarifier is customarily at a temperature of 202°–210° F., appreciably lower than the entering temperature of the juice, and the mud has a substantially lower pH than the entering juice. In consequence, the mud in the thickening chamber has heretofore had a definite tendency to change physically and chemically and to otherwise deteriorate and become more or less unruly from the filtration and thickening standpoints.

We have discovered that it is practically feasible and desirable to substantially increase the density and to materially reduce the decomposition of decomposable mud constituents and to improve the filterability of the mud, by adding lime to the mud in the thickening chamber in the amount required to give the thickened mud a pH in or about the range 7–8. In the preferred form of the invention, the lime is fed into the mud blanket or layer accumulating in the thickening chamber at points below the upper surface of said layer or blanket, so that the addition of the lime to the mud has no significant tendency to increase the pH of the clarified juice removed from the clarifier.

The increase in the density of the mud withdrawn from the clarifier is practically desirable because it is attended by an increase in the overall amount of clarified juice obtained from a given amount of entering juice, and because it reduces the bulk of the mud and increases its filterability. In the environment of low pH, high temperature and low density of the sucrose solution, such decomposition also leads to inversion and consequent loss of sucrose. The avoidance of decomposition also minimizes the risk of contamination of the clarified juice withdrawn from the clarifying compartments by decomposition products rising from the mud being thickened.

In practice, lime is preferably added to the mud being thickened by feeding milk of lime continuously into a mud blanket or layer below the upper surface of the blanket through a pipe from lime mixing and feeding apparatus of the usual type employed in liming sugar juice and other liquids. With the lime added to the mud in the thickening chamber as described, the pH of the mud is subject to close control at all times. The amount of lime to be added depends upon the character of the mud to which it is added, and is effected in some cases by the use to be made of the mud.

In practice, as is well known, the amount of lime which should be added to sugar cane juice to obtain good defecation results in respect to the character of the clarified juice produced, depends upon a variety of factors including the physical characteristics and chemical composition of the juice coming away from the cane mill. In general, we have found that the addition to the mud being thickened of about ten percent of the amount of lime which should be added to the sugar cane juice to obtain optimum defecation results, will give good results in the treatment of the mud. In general, the amount of lime added to the body of mud being thickened is of the order of 0.15 pound of CaO per ton of cane juice being clarified. We have also found that when the pH of the mud is within a certain limited range, better mud thickening results are obtainable than when the pH of the mud is at either side of the range. Thus, in clarifying sugar cane juice of average character and composition, we have found that definitely better mud thickening results are obtainable if the pH of the mud is kept between 7 and 8, than are obtainable when the mud pH is definitely lower than 7 or higher than 8.

The invention is adapted for use in, and in connection with multitray clarifiers of various known forms and designs. For the purposes of our invention, the clarifiers may well be of the widely used type in which the mud passes from the clarifying compartments to the lower thickening chamber through a well defined central flow path. For the use of such a clarifier in the practice of the invention, it should include a mud distributing cone in the thickening chamber with its apex beneath the lower end of said flow path, and should include a rake or rakes above the cone to move deposited mud accumulating on the cone, off of the latter at its periphery, and into the mass of mud collected in the lower portion of the thickening chamber. In the use of such a clarifier, the lime added to the mud in the thickening chamber is advantageously passed into the mud at a plurality of points beneath the upper surface of the mud layer or blanket on the cone, through piping supplying the lime under pressure.

In many cases, the use of the invention has more than doubled the suspended solid content of the mud discharged from the clarifier. The invention also permits of an improved control of the liming features of the defecation process, and thus permits the liming to be sharply adapted to the characteristics of the particular variety of cane juice being crushed at any given time.

The various features of novelty which characterize our invention are pointed out with particularity in the claims annexed to and forming a part of this application. For a better understanding of the invention, however, its advantages and specific objects attained with its use, reference should be had to the accompanying drawings and descriptive matter in which we have illustrated and described preferred embodiments of the invention.

Of the drawings:

Fig. 1 is a view diagrammatically illustrating a form of apparatus for use in clarifying cane sugar juice in accordance with the present invention;

Fig. 2 is a diagrammatic view showing lime mixing and supplying apparatus;

Fig. 3 is an elevation with parts broken away and in section illustrating a special form for supplying lime to mud being thickened;

Figure 4:
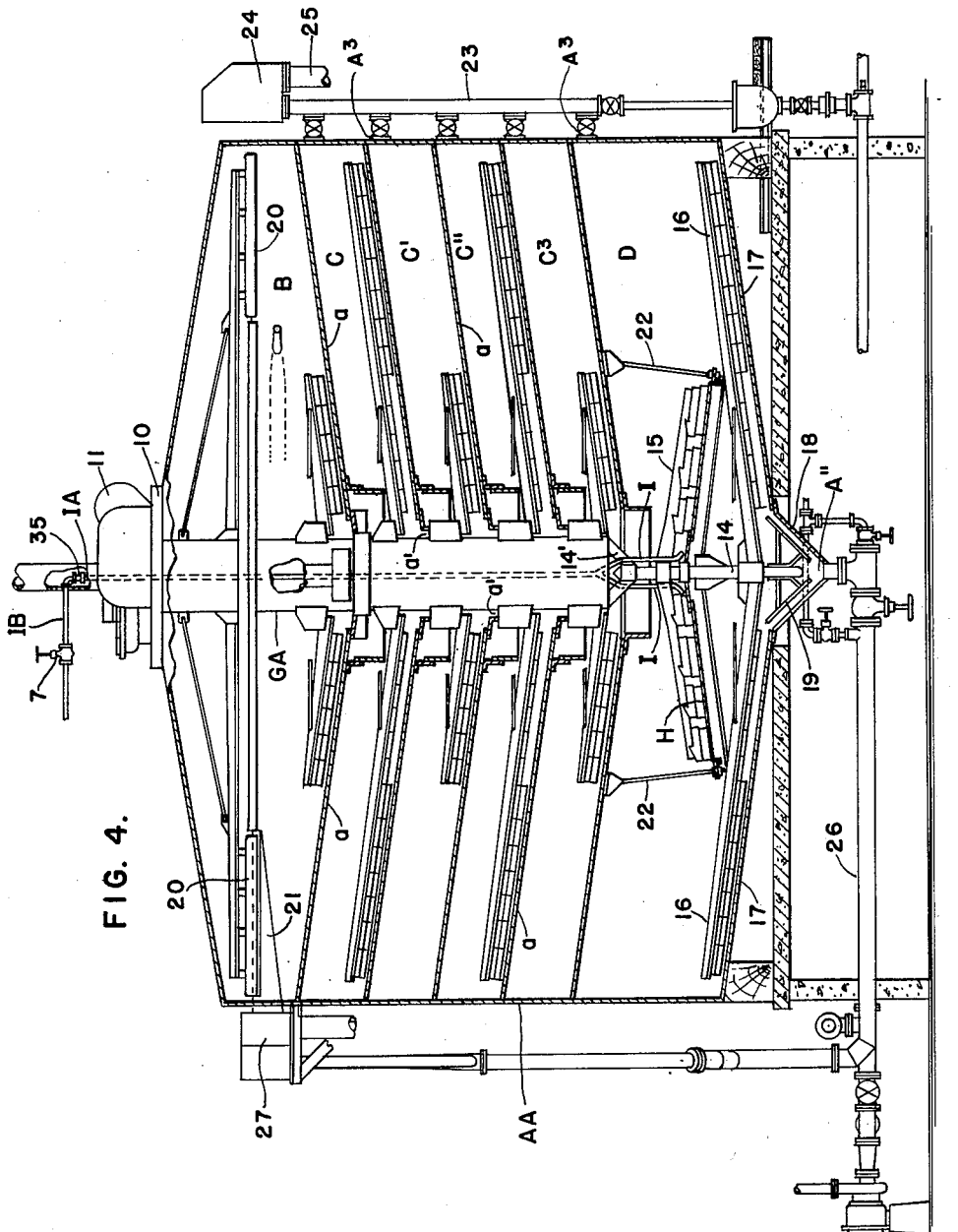
Fig. 4 is a vertical sectional view substantially through the center of a rod tray clarifier.

In the form of the apparatus shown diagrammatically in Fig. 1, A represents a continuous multitray clarifier comprising a tank separated by dished or conical trays $a$ into an upper flocculating chamber B, two intermediate clarifying chambers C and C', and a lower mud thickening compartment or chamber D. The clarifier A is provided with an inlet A' at its upper end receiving juice to be clarified coming to the clarifier from the cane mill through piping I that enters the tank tangentially, in which a liming chamber E and a juice heater F are connected. The clarifier A has a mud outlet A'' at its lower end, and has separate clear juice outlets $A^3$ opening from the upper portions of the compartments C, C' and D. The trays $a$ are formed with central openings $a'$.

The clarifier inlet A' opens into the flocculating chamber B from which juice passes to the subjacent compartments of the clarifier through a vertical distributing pipe or hollow body G which passes through, but does not fill, the central openings $a'$ in the trays $a$. The pipe G is formed with vertically elongated inlet ports G' through which juice passes into the pipe from the flocculating chamber B. The pipe G is provided with upper and lower sets of outlet nozzles G'' through which juice passes into the compartments C and C', respectively, and is open at its lower end to supply juice to the clarifying and mud thickening compartment D. Mud depositing on each tray $a$ is moved along the latter to its respective central opening $a'$ and passes downward through the annular portion of the latter surrounding the tubular body G. All of the mud separating from the juice in the compartments B, C and C' thus passes into the thickening chamber D through the opening $a'$ in the tray $a$ which forms the bottom wall of the compartment C'. As shown, the mud thus entering the chamber D deposits on the convex upper side of a mud distributing cone H centrally disposed in the upper portion of the chamber D. As shown diagrammatically in Fig. 1, the lime, or more accurately, the milk of lime, added to the mud in the thickening compartment D, is supplied under suitable pressure by pipes I which have their discharge ends in the mud layer or blanket of the cone H adjacent its apex and beneath the upper surface of said mud layer or blanket. In practice, the pipes I may well be branches of a juice supply pipe depending through the tubular body G as shown in Fig. 2.

The milk of lime added to the raw juice in the liming tank E, and injected into the mud in the thickening compartment D through the pipes I, may be supplied with advantage, in some cases, by a single mixing tank J from which lime is continuously withdrawn in normal operation by a pump K. The lime passes from the pump K to a distribution pipe 2 through a control valve 3. Flushing water may be passed into the pipe 2 through a valve 4 connecting a water supply pipe 5 to the pipe 2. The pipe 2, as diagrammatically shown in Fig. 2, has one branch including a control valve 6 through which lime is supplied to the liming chamber or tank E, and has a second branch including a control valve 7 through which lime is passed to the pipes I which discharge lime into the mud in the lower portion of the clarifier A.

To simplify the illustration, no means are shown in Figs. 1 and 2 for moving the mud collecting on the trays $a$ to their respective central outlets $a'$, or for working the mud off the cone H at its periphery and for working the mud along the conical bottom wall of the clarifier tank to the mud outlet $A''$, but suitable means for those purposes are illustrated in Figs. 4 to 7 inclusive. In the use of the apparatus shown diagrammatically in Figs. 1 and 2 in the practice of the novel method disclosed and claimed herein, juice passes continuously to the clarifier inlet $A'$ through the juice piping I and the liming chamber E and heating device F. In the chamber E, the juice has its pH increased to a value within the range 7–8, or other range which the plant operator considers appropriate for the particular juice undergoing clarification. In the heater F, the juice is heated to a temperature which, ordinarily, is within the range of 212°–214° F. The limer E and heater F may be of well known commercial types and hence need not be further described herein.

Into the compartment B, the hot limed juice is supplied and briefly detained to effect flocculation. From the flocculating chamber B, the juice passes into the distributing conduit G through its upper inlet ports $G'$. The juice passes from the pipe G into the clarifying compartments C and $C'$ through the lateral outlet nozzles $G''$, and into the lower clarifying and thickening compartment D through the open lower end of the conduit G. In each of the compartments C, $C'$ and D, sedimentation normally proceeds continuously, with a resultant accumulation of clear juice in the upper portion of the compartment from which the clarified juice is continuously withdrawn through the respective outlets $A^3$. Solids separating out of the juice in the compartments B, C and $C'$ settle towards and form mud layers on the trays $a$ forming the bottom walls of those compartments. The mud in the layer thus formed on the bottom wall of each of compartments B, C and $C'$ is gradually worked along the inclined bottom surface of the compartment to the corresponding central outlet $a'$, by mud rakes or the like, which are not illustrated in Figs. 1 and 2, but may be like those shown in Figs. 4–7. In the upper portion of the clarifying and thickening compartment D, sedimentation and juice clarification proceed as in the compartments C and $C'$, but the overall solids content of the mud is substantially lower in the compartments C and $C'$ than in the compartment D which receives all of the mud settling out of the juice in the flocculating compartment B, and in the compartments C, $C'$ and D.

The amount of lime which should be added to the mud in the chamber varies with conditions, as previously explained, and may be regulated in apparatus of the form diagrammatically illustrated in Fig. 2, by adjustment of the valve 7 alone, or in conjunction with an adjustment of the valve 6. As previously explained, however, the amount of lime added to the mud in the compartment D should be sufficient to insure that the pH of the mud discharged from the clarifier through its mud outlet $A^2$ is kept within the range of about 7–8, in which the thickening operation proceeds more satisfactorily than when the mud pH is higher or lower.

As will be apparent to those skilled in the art, the novel method of clarification disclosed and claimed herein, may be carried out with the air of continuous clarifiers of any one of various well known types and forms. In particular, the clarifier may advantageously be of the widely used type and form illustrated by way of example in Figs. 4 to 7. For the purposes of the invention hereof, the clarifier AA shown in those figures differs significantly from the clarifier A shown in Fig. 1 only in details of construction and in its inclusion of four intermediate clarifying compartments C, $C'$, $C''$ and $C^3$, in lieu of the two intermediate compartments C and $C'$ of Fig. 1.

Figure 5:
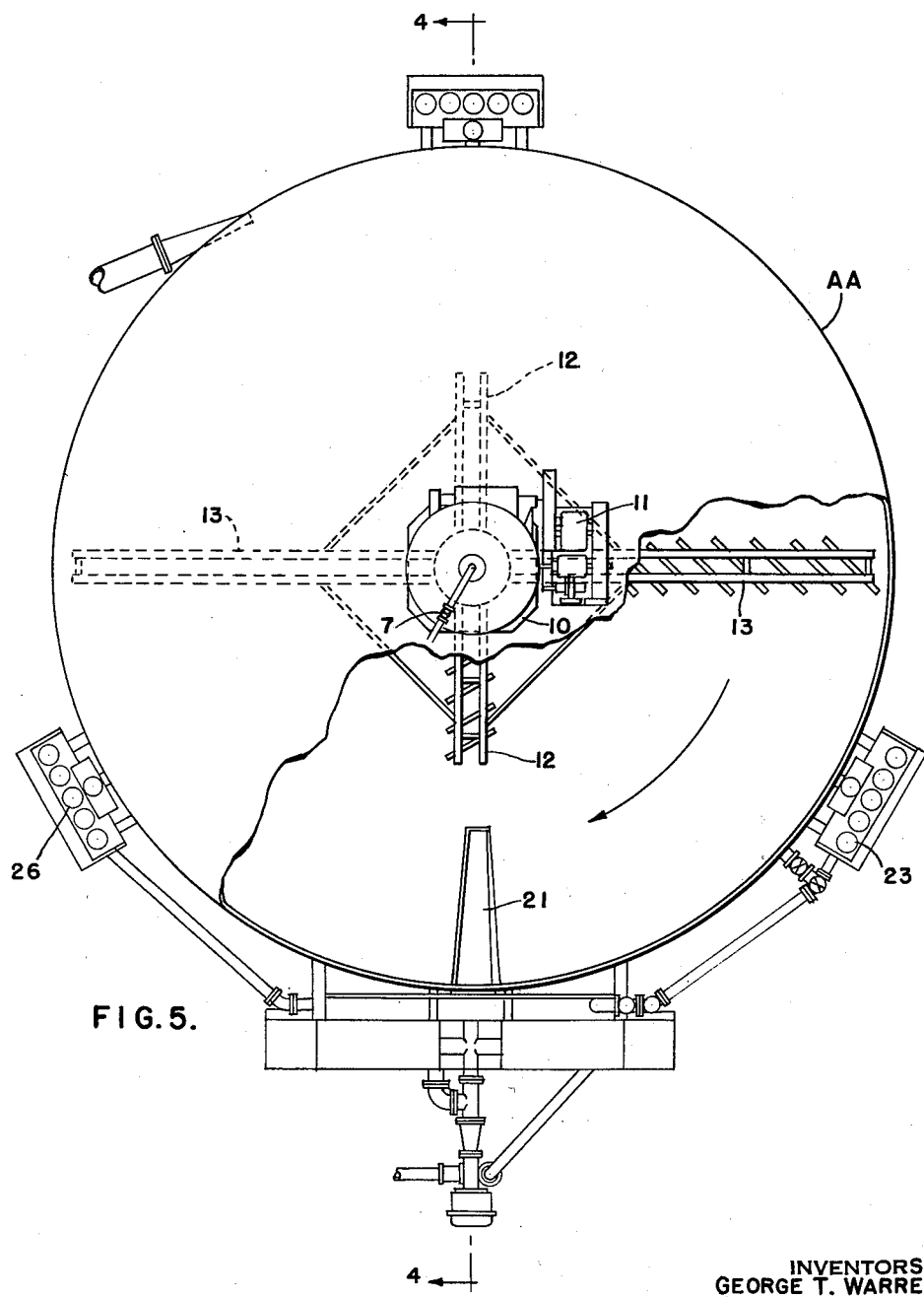
Fig. 5 is a horizontal section on the line 5—5 of Fig. 4.

In the clarifier AA shown in Figs. 4 to 7, a hollow, rotatable central column GA serves the juice distributing purposes of the pipe G of Fig. 1 and also supports and rotates the mud rakes and other rotating elements. The column GA is suspended from rotating mechanism mounted on a platform 10 at the top of the clarifier tank structure and centrally disposed with respect to the latter. The mechanism mounted on the platform 10 includes a motor 11 through which the desired slow rotation of the column GA is effected. The latter supports rake arms for working mud off of the trays $a$ forming the bottom walls of the flocculating compartment B and the intermediate clarifier trays C, $C'$, $C''$ and $C^3$. As shown in Fig. 5, there are two short rake arms 12 and two long rake arms 13 of the conventional type and form in each of said compartments.

At its lower end, the central column GA is provided with an axial depending shaft extension 14, connected to the column through a spider $14'$. The shaft 14 extends through a central aperture in the mud cone H and supports and rotates an upper set of rake arms 15 above and operating to work mud off of the mud cone H, and a lower set of rake arms 16 below the cone H and operating to work mud along the dished bottom wall 17 of the clarifier AA to its central mud outlet $A^3$. As shown, the mud outlet portion of the clarifier AA comprises a conical central depression 18 in the bottom wall 17, and the shaft 14 carries inclined mud ejecting blades 19 working in said depression. As shown in Fig. 4, the rotating central column GA also carries scum-sweeping arms and mud moving arms 20 in the flocculating chamber which gently mix the juice and work scum floating at the top of the body of sugar juice in the compartment B, into a scum take-off trough 21. As shown in Fig. 4, the mud cone H is suspended by links 22 from the tray $a$ above it.

The clarified juice outlets $A^3$ from the compartments C, $C'$, $C^3$ and D are provided with individual connections, each including a riser pipe 23, for delivering clarified juice into a common collecting chamber 24 from which the clarified juice may be discharged through a pipe 25. In accordance with the regular practice of the art, the effective length of each riser pipe 23 is subject to adjustment to thereby vary the level at which the pipe overflows and thus increase or decrease the rate of juice outflow from the corresponding clarifying compartment. The mud passing out of the clarifier AA through its bottom mud outlet A" is drawn away from the outlet through the piping 26 by a mud pumping apparatus 27 which customarily includes two mud pumps. The arrangement of the piping 26 and pumps 27 may be, and as shown, is conventional, and need not be further described or illustrated.

Figure 6:
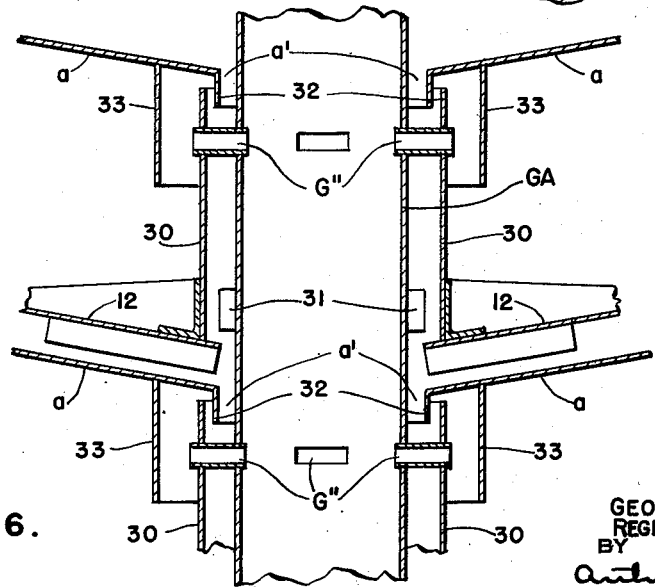
Fig. 6 is an enlarged fragmentary vertical section through a portion of the central feed column and adjacent settling compartments and the flocculation compartment of the apparatus shown in Fig. 4.

The clarifier AA includes means, clearly shown in Figs. 4 and 6, which provide a definite path of downflow into the thickening chamber D for the mud passing downward through the central outlets $a$ in the bottom walls of the compartments B, C, C', C" and $C^3$, so as to effectually segregate the downwardly flowing mud from the juice streams passing through the outlet nozzles G" into the adjacent clarifying compartments, and from the clarified juice and juice undergoing clarification in the last mentioned compartments. The means for thus defining and segregating the downflow mud path comprises a series of aligned cylindrical sections or sleeves 30, arranged one in each clarifying compartment. The sleeves 30 are larger in diameter than the center column GA, and are coaxial with and surround the column and each is somewhat shorter than the vertical distance between the trays $a$ forming the top and bottom walls of the corresponding compartment. Each sleeve 30 is supported, in part, by the corresponding set of nozzles G", and in part by radial webs 31 extending between and welded at their ends to the center column and to the sleeve.

The internal diameter of each sleeve is somewhat greater than the diameter of the opening $a'$ in the tray above it, and the upper end of each sleeve loosely surrounds the lower portion of a cylindrical flange or boot 32. The latter depends from the tray above the sleeve at the margin of the tray opening $a'$. The upper end portion of each sleeve is surrounded by a coaxial cylindrical sleeve or boot 33 secured to and depending from the underside of the adjacent tray. The boot 33 has an internal diameter substantially greater than the outside diameter of the sleeve 30 and the lower end of the boot 33 is at a level below the adjacent feed nozzle $G^{11}$. The boot 33 thus serves to deflect incoming juice downwardly into the central portion of the corresponding compartment. Each sleeve 30 has its lower end connected to the inner ends of the corresponding mud rake arms 12 and 13 which are thus connected to and supported by the rotating center column GA. With the construction described and clearly shown in Fig. 6, the column GA forms the inner wall and the sleeves 30 and boots 32 form a practically continuous outer wall for an annular mud conduit surrounding the center column and extending from the flocculating compartment B to the clarifying and thickening compartment D. The upper end of each sleeve 30 and the adjacent boots 32 and 33 collectively form a sort of labyrinth packing operative to prevent any significant flow of juice or mud between the compartment including the sleeve and the compartment above the sleeve with the liquid pressure conditions in the clarifier prevailing in normal operation.

In the clarifier AA, the pipes I are depending branches of a pipe IA axially disposed in and supported by the rotating central column GA. As shown in Fig. 4, the pipe IA is connected above the upper end of the column GA through a swivel coupling 35 to a stationary pipe IB connected to a source of milk of lime to be fed into the mud on the cone H. The pipe IB may be connected, for example, through the valve 7 to the outlet pipe 2 of lime mixing and distributing apparatus of the character shown diagrammatically in Fig. 2.

Figure 7:
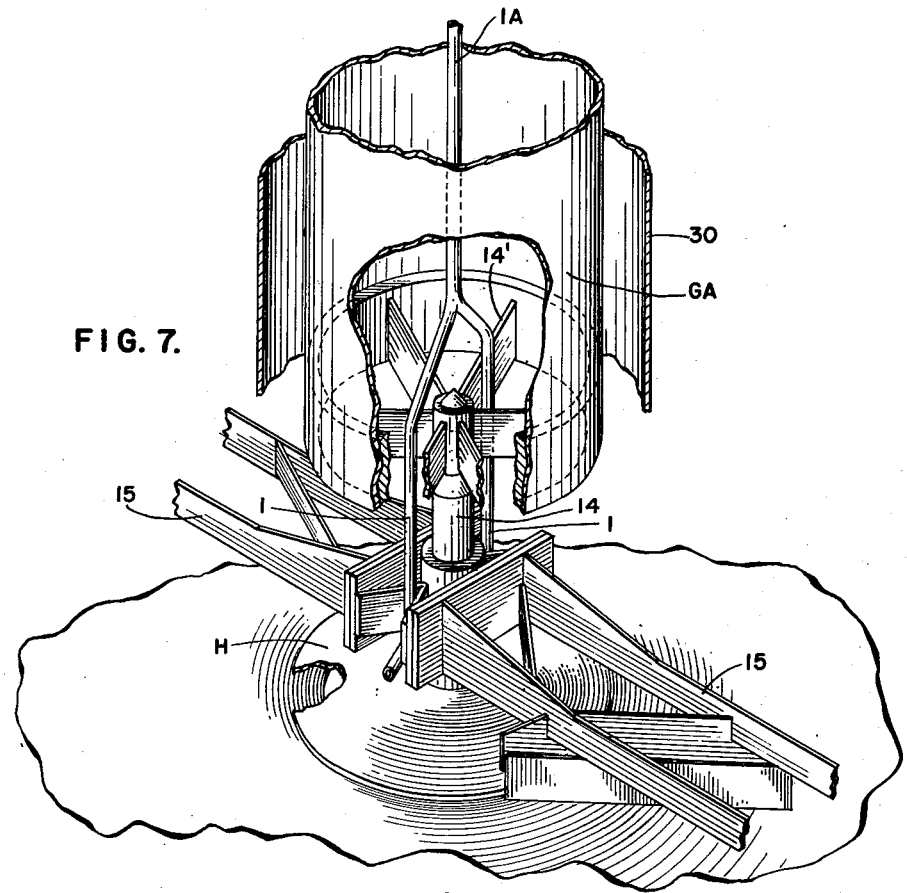
Fig. 7 is a perspective view, with the parts broken away and in section, of a portion of the apparatus shown on a smaller scale in Fig. 4.

As shown in Figs. 4 and 7, the upper end portion of each pipe I is bent or offset. In consequence, if either pipe I is filled or clogged by solid lime, its removal presents difficulties which are avoided with the pipe arrangement shown in Fig. 3. In that arrangement, each of the short bent pipes I shown in Figs. 4 and 7 is replaced by a long straight pipe IC. Each of the pipes IC has its upper end connected through a connection or fitting part 36 to a common short pipe IA, which advantageously is substantially larger in cross section than the pipes IC. The pipes IC are oppositely inclined away from the axis of the pipe IA through a small angle so as to spread the lower ends of the pipe far enough apart to clear the shaft 14 and to discharge lime into the mud layer on the cone H at suitably displaced points. The lower ends of the pipes IC may be strapped or otherwise secured to the spider 14' by which the shaft 14 is connected to the column GA. The required inclination of each pipe IC to the associated pipe IA is too small to prevent passage of a flexible cleaning rod down through the pipe IA and thence through either pipe IC, when this is necessary or desirable. The cleaning rod may be passed into the pipe IA through the swivel coupling 35 and an opening in the piping IB normally closed by a plug 37.

In the arrangement shown in Fig. 3, the pipe IA and thereby the pipes IC, are supported by a crossbar 38 having its ends received in diametrically opposed saddle-like supports 39 secured to the inner wall of the central column GA adjacent the upper end of the latter. When the upper end portion of the central column GA extends through the platform 10 and column supporting mechanism mounted on the latter, as it may, the upper end of the column may be closed by a removable cover 40 formed with a central opening for the passage of the pipe IA, and provided with packing means 41 for preventing leakage through the joint between the cover and the pipe IA. With the arrangement shown in Fig. 3, the pipe IA and its attached branch pipes IC, may be readily replaced, if and when replacement becomes desirable.

Except for its inclusion of the mud cone H and the piping for feeding lime into the mud thickening compartment D, and the form of the mud moving means in the compartment D, the apparatus shown in Figs. 4, 5 and 6 is substantially identical in form and substance with apparatus disclosed and claimed in the Weber Patent No. 2,253,878 of August 26, 1941.

It is to be understood, however, that in the practice of the invention, use may be made of other types of continuous clarifiers. In particular, the general principles of the invention may be utilized in a clarifier of the type having its superposed compartments separated by dished trays with their convex sides uppermost and spaced at their peripheries from the tank wall to provide channels or ports for the downflow into the bottom, mud thickening compartment of the mud settling out of the juice in the upper compartments. One clarifier of the last mentioned type is shown, for example, in the McHugh and Weber Patent No. 2,340,132 of January 25, 1944.

While in accordance with the provisions of the statutes, we have illustrated and described the best forms of embodiments of our invention now known to us, it will be apparent to those skilled in the art that changes may be made in the forms of the apparatus disclosed without departing from the spirit of our invention, as set forth in the appended claims, and that in some cases certain features of our invention may be used to advantage without a corresponding use of other features.

Having now described our invention, what we claim as new and desire to secure by Letters Patent is:

1. In the known process of continuously clarifying sugar cane juice by sedimentation and decantation in which hot limed juice is passed into a series of superposed clarifier compartments from which clarified juice is withdrawn, and in which the mud including the solids settling out of the juice in the different compartments is collected and thickened by moving elements in the lowermost of said compartments, the improvement which consists in passing sufficient lime into admixture with the mud being thickened in said lowermost compartment to substantially minimize decomposition of the mud and inversion of its sucrose content.

2. The process improvement specified in claim 1, in which sufficient lime is passed into admixture with the mud being thickened, to raise the pH of the mud being thickened to approximate equality with the pH of the clarified juice.

3. The process improvement specified in claim 1, in which the quantity rate at which lime is passed into admixture with the mud is approximately one tenth of the rate at which lime is added to the juice to be clarified.

4. The process improvement specified in claim 1, in which the quantity rate at which lime is passed into admixture with the mud being thickened is about 0.15 pound of CaO per ton of juice being clarified.

5. The process improvement specified in claim 1, in which the lime added to the mud being thickened is sufficient to raise the pH of the mud being thickened to a value of 7-8.

6. The process improvement specified in claim 1, in which the quantity rate at which lime is added to the mud being thickened is that required to raise the pH of said mud to approximate equality with the pH of the clarified juice.

7. The process improvement specified in claim 1, in which the lime added to the mud is passed into contact with the mass in the thickening compartment at a level below the top surface of said mass.

8. The process improvement specified in claim 1, in which the lime added to the mud being thickened is injected into said mud under pressure.

9. The process improvement specified in claim 1, in which the lime is injected under pressure into the mud being thickened and is worked into admixture with the mud as the latter is agitated and thickened.

10. In a continuous process of clarifying sugar juice by sedimentation and decantation, the method which consists in heating and liming the juice to be clarified to give the juice a temperature of about 212° F. and a pH of about 7-8, passing the hot limed juice into a sedimentation chamber in which solids settle out of an upper stratum of clarified juice, withdrawing clarified juice from said stratum, withdrawing mud including settled solids from said chamber, adding lime to the mud so withdrawn and agitating it to obtain a thickened mud product having a pH of the order of 7 to 8.

11. In the continuous clarification of sugar cane juice by the sedimentation and decantation process in superposed clarifying compartments, the lowermost of which serves as a mud thickening chamber, the method which consists in heating the juice to be clarified and adding lime thereto to give it a pH of the order of 7-8, passing the hot limed juice into said clarifying compartments, withdrawing clarified juice therefrom, passing to said thickening chamber the mud including the solids settling out of the juice in the clarifying compartments above the thickening chamber, moving the mud in said chamber to thicken it, and adding lime to the mud in said thickening chamber as required to give the thickened mud a pH of the order of 7-8.

12. In a continuous process of clarifying sugar juice by sedimentation and decantation, the method which consists in adding lime to the juice to be clarified at the rate required to give the clarified juice pH of the order of 7-8, heating the juice to a temperature of about 212° F., passing the hot limed juice into a sedimentation chamber in which solids settle out of an upper stratum of clarified juice, withdrawing clarified sugar juice from said stratum, withdrawing mud including settled solids from said compartment, adding lime to the mud at a rate which is approximately one tenth of the first mentioned rate and moving the mud to obtain a thickened mud product.

13. In the known process of continuously clarifying sugar cane juice by sedimentation and decantation in which hot limed juice is passed into a series of superposed clarifier compartments from which clarified juice is withdrawn, and in which the solids settling out of the juice in the different compartments is collected and thickened by moving elements in the lowermost of said compartments, the improvement which consists in passing lime into admixture with the mud being thickened in said lowermost compartment as required to raise the pH of the mud being thickened to approximate equality with the pH of the clarified juice.

REGINALD ALBERT JORDAN.
GEORGE THOMAS WARREN.

REFERENCES CITED

The following references are of record in the file of this patent:

UNITED STATES PATENTS

| Number | Name | Date |
|---|---|---|
| 1,266,882 | Thomas et al. | May 21, 1918 |
| 1,577,340 | Sandmann | Oct. 13, 1925 |
| 1,578,221 | Vachier | Mar. 23, 1926 |
| 1,688,184 | Hartmann | Oct. 16, 1928 |
| 2,093,759 | Hartmann | Sept. 21, 1937 |
| 2,257,362 | Zitkowski | Sept. 30, 1941 |
| 2,377,875 | Geissler | June 12, 1945 |